United States Patent [19]

Braitberg

[11] 4,136,347
[45] Jan. 23, 1979

[54] METHOD FOR MAKING A HOLOGRAPHIC TONE WHEEL FOR USE IN A SYNC-OFF-TACH TAPE DRIVE SYSTEM

[75] Inventor: Michael F. Braitberg, Littleton, Colo.

[73] Assignee: Honeywell Inc., Minneapolis, Minn.

[21] Appl. No.: 758,313

[22] Filed: Jan. 10, 1977

Related U.S. Application Data

[62] Division of Ser. No. 557,792, Mar. 12, 1975, Pat. No. 4,103,214.

[51] Int. Cl.² .................. G03G 16/00; G03H 1/06
[52] U.S. Cl. ............................ 346/151; 318/313; 350/3.61; 350/3.78; 360/51
[58] Field of Search ............... 346/151; 360/73, 51; 365/125, 126, 216; 318/313, 480, 640; 350/3.5

[56] References Cited

U.S. PATENT DOCUMENTS

| | | | |
|---|---|---|---|
| 3,096,444 | 7/1963 | Seward | 318/313 |
| 3,627,916 | 12/1971 | Bestenreiner | 350/3.5 |
| 3,634,682 | 1/1972 | Gold | 318/640 |
| 3,735,031 | 5/1973 | Waters | 346/151 |
| 3,897,247 | 7/1975 | Schadlich | 346/151 |
| 4,021,606 | 5/1977 | Takeda | 365/125 |
| 4,025,958 | 5/1977 | Orima | 360/73 |

OTHER PUBLICATIONS

IBM Tech. Discl. Bull., vol. 8, No. 11, 4–66, p. 1581, "Hologram Memory for Storing Digital Data".
IBM Tech. Discl. Bull., "Device for Magnetically Recording a Timing Disk", vol. 8, No. 12, 5/66.

Primary Examiner—Jay P. Lucas
Attorney, Agent, or Firm—Laurence J. Marhoefer; Lockwood D. Burton; Mitchell J. Halista

[57] ABSTRACT

A holographic recording is made on a tone wheel which is arranged to be driven by a capstan motor and capstan assembly. The holographic recording is a series of radial holograms on the tone wheel which recording is matched to the mechanical system driving the tone wheel by incorporating mechanical drive errors in the holographic recordings.

9 Claims, 3 Drawing Figures

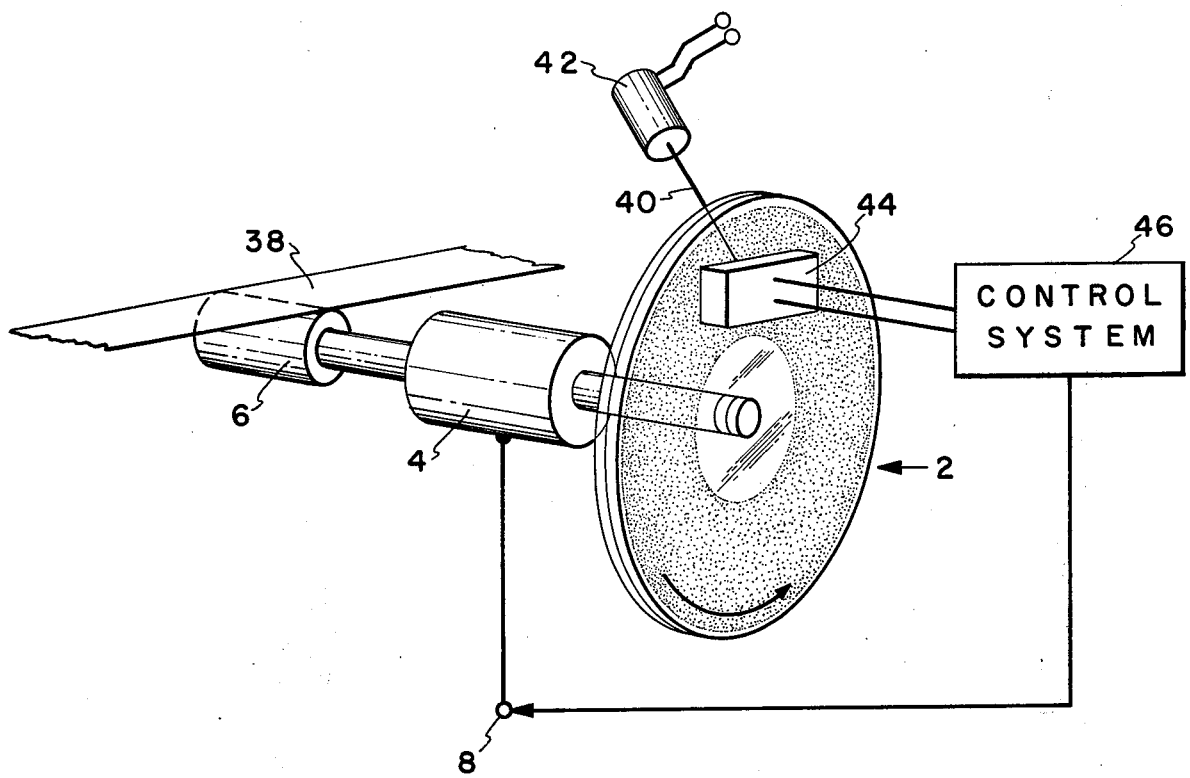
F I G. 3

METHOD FOR MAKING A HOLOGRAPHIC TONE WHEEL FOR USE IN A SYNC-OFF-TACH TAPE DRIVE SYSTEM

This is a divisional of application Ser. No. 557,792 filed on Mar. 12, 1975 now U.S. Pat. No. 4,103,214.

CROSS-REFERENCE TO A RELATED APPLICATION

Subject matter shown but not claimed herein is shown and claimed in a copending application of Michael F. Braitberg et al. entitled "Holographic Memory With Moving Memory Medium", filed on Dec. 14, 1973 and bearing Ser. No. 424,991 now U.S. Pat. No. 3,976,354 and a copending application of Michael F. Braitberg entitled "Error Cancelling Sync-Off-Tach Tape Drive System" filed on Mar. 12, 1975 and bearing Ser. No. 557,792 now U.S. Pat. No. 4,103,214.

BACKGROUND OF THE INVENTION

1. Field of the Invention

The present invention is directed to a magnetic tape drive system. More specifically, the present invention is directed to a motor, capstan and tone wheel assembly having means for cancelling intrinsic errors of the tape drive system.

2. Description of the Prior Art

Conventional magnetic tape drive systems for driving a magnetic recording tape have used various means for controlling the speed of tape in order to maintain the speed at a constant predetermined level, e.g., to control a tape playback speed to be identical with a tape recording speed. For example, the tape can be prerecorded with a clock, or sync, track at the time the data is being concurrently recorded in the adjacent recording track. When the tape is used in a data-reproducing system to playback the data recorded thereon, the sync track is separately read by a control system arrangement commonly referred to as a "sync-off-tape" type of tape playback speed control. In such a prior art system, the signal from the sync track is used in a feedback control to control the speed of the motor driving the tape during the playback operation and, hence, to maintain the playback speed of the tape at the same speed used during the recording process. Thus, the intrinsic tape drive system errors created by capstan eccentricity, bearing noise, etc. are minimized since the control signal comes from the tape itself and is affected by the same tape drive system errors. Since the mechanical errors are included in the aforesaid feedback controls, the servo system, if it has sufficient gain and band width, is able to cancel all of these intrinsic drive system errors. An example of such a prior art tape drive control system is shown in U.S. Pat. No. 3,789,379 of Ivars P. Breikss, which was issued on Jan. 29, 1974.

On the other hand, in another prior art arrangement, i.e., in a so-called "sync-off-tach" tape drive system, a tone wheel is fastened to the shaft of the drive motor used to drive the tape capstan, and a sync signal is derived from a sensor operatively associated with the tone wheel in a so-called tachometer assembly. In this case, the tape drive errors due to capstan eccentricity, bearing noise, mechanical inperfections in the motor and tone wheel, etc. are outside the feedback control loop and, hence, introduce errors in the playback speed which are reflected as errors in the playback data. Since the "sync-off-tape" type servo control system is often not practical inasmuch as it involves the use of a data-recording track and requires a custom prerecording of a clock track, the "sync-off-tach" type control system is more commonly used and is, as mentioned as above, subject to the intrinsic errors in the speed of the driven tape. An example of a prior art tape drive system for cancelling intrinsic errors in a sync-off-tach mode of operation is shown in U.S. Pat. No. 3,648,141 of David W. Scheer which issued on Mar. 7, 1972. In this prior art tape drive system, the intrinsic errors of the drive system for incremental tone wheel positions are recorded in a memory during a recording operation and are utilized during the playback operation to compensate for the same intrinsic errors at each corresponding incremental tone wheel position. However, this prior art compensation technique involves the use of a separate data storage memory, digital-to-analog converters and associated electronics which greatly increases the cost and complexity of a tape transport utilizing such a technique.

SUMMARY OF THE INVENTION

Accordingly it is an object of the present invention to provide an improved "sync-off-tach" type tape drive system having a simplified control system for cancelling intrinsic drive system errors of the tape drive system.

Another object of the present invention is to provide an improved method for making a tone wheel for use in a "sync-off-tach" type tape drive system.

In accomplishing this and other objects, there has been provided, in accordance with the present invention, a tape drive control system utilizing a tone wheel having a prerecorded hologram thereon. The hologram is recorded during an initial operation of a motor/capstan/tone wheel assembly by a holographic recording technique on the tone wheel which tone wheel includes a transparent substrate coated with an erasable thermoplastic film. The holographic recording on the tone wheel is read during subsequent operation of the motor/capstan/tone wheel assembly by a laser playback system to provide control signals for a motor drive energizing means to correct intrinsic drive system errors.

BRIEF DESCRIPTION OF THE DRAWINGS

A better understanding of the present invention may be had when the following detailed description is read in connection with the accompanying drawings in which:

FIG. 3 is a pictorial illustration of a tape drive system incorporating the prerecorded tone wheel/capstan/motor assembly shown in FIGS. 1 and 2.

DESCRIPTION OF THE PREFERRED EMBODIMENTS

Detailed Description

Figure 1:
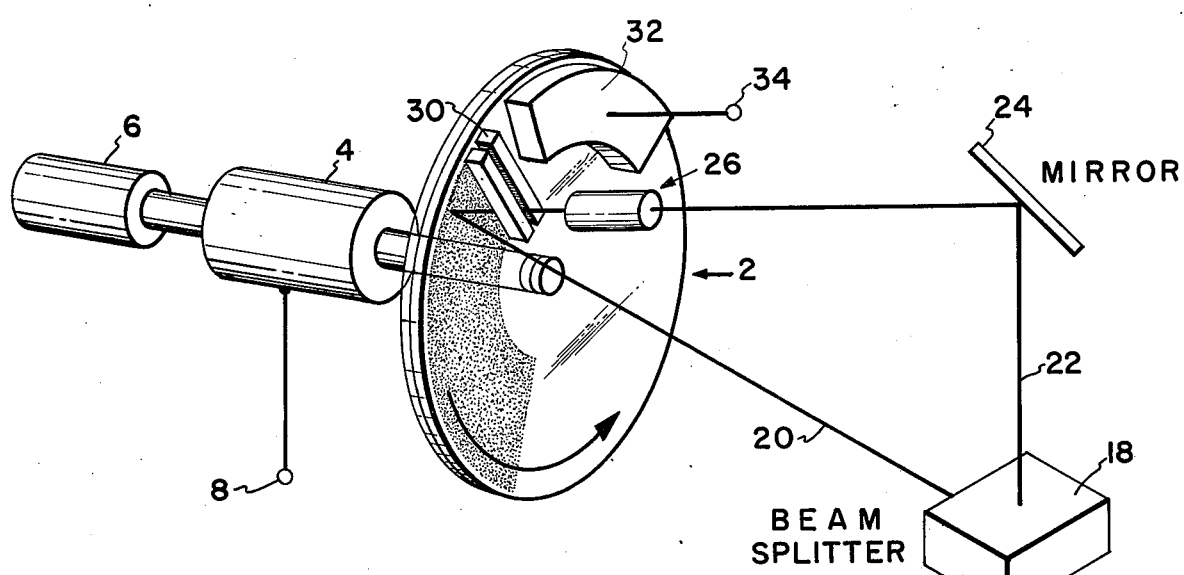
FIG. 1 is a pictorial illustration of a code wheel recording system incorporating the present invention.
Figure 2:
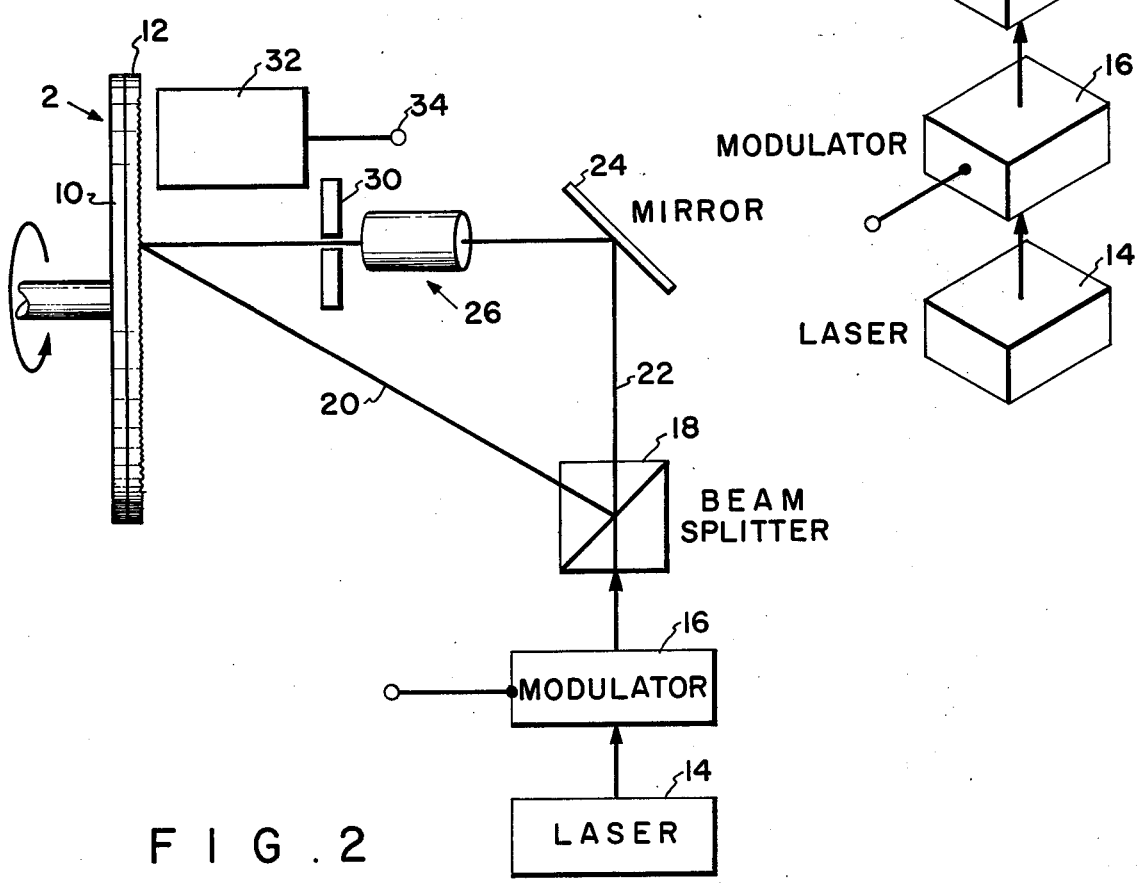
FIG. 2 is a simplified showing of the code wheel recording system shown in FIG. 1.

Referring to FIGS. 1 and 2 in more detail, there is shown a pictorial diagram of an embodiment of the present invention used to prepare a tone wheel/motor/capstan assembly. The tone wheel 2 is mounted on a drive shaft rotateably driven by a motor 4. A tape drive capstan 6 is also mounted on the motor driven drive shaft on the other side of the motor 4 from the tone wheel 2 a source of an energizing signal (not shown) for driving the motor 4 at a predetermined speed. The tone wheel 2 includes a transparent substrate 10 having a thermoplastic layer 12 covering a face of the transparent substrate 10. A laser source 14 is arranged to supply a coherent light beam through a light modulator 16. A modulated output beam from the modulator 16 is applied to a prism beam splitter 18 to provide a reference beam 20 and a signal, or object, beam 22. The recording beam 22 is deflected by a mirror 24 through a Fourier transform optical system 26.

The Fourier transform optical system 26 includes cylindrical Fourier transform lens, not shown, to converge the signal beam 22 along an X axis which is the radial axis of the tone wheel 2 and a subsequent cylindrical lens, not shown, to converge the signal beam 22 along a Y axis which is in the direction of motion of the tone wheel 2. Further discussion of this structure and operation is found in the aforesaid copending Braitberg et al. patent application. A summary of holographic recording techniques is found in "Holographic Information Storage" by E. G. Ramberg in the "RCA Review", Vol. 22, March, 1972, pages 5 to 53. Briefly, the orientation of the reference beam 20 and the object beam 22 is such that two requirements are met. First, the hologram to be stored on the tone wheel 2 is a one-dimensional Fourier transform hologram having its essentially single dimension substantially normal to the direction of motion of the recording medium to yield a high hologram packing density. Secondly, the interference fringes run parallel to the motion of the tone wheel 2 whereby the exposure time during recording of the hologram may vary without adversely affecting the stored hologram.

An output beam from the Fourier transform optics 26 is directed through a radially oriented slit 30 onto the thermoplastic surface 12 of the tone wheel 2. The reference beam 20 and the signal beam 22 interfere at the thermoplastic surface 12 to produce a one-dimensional Fourier transform hologram. The recording of a hologram on the surface of a thermoplastic surface is well-known in the art as shown in U.S. Pat. No. 3,821,722 and is further discussed in the aforesaid copending patent application. An electrical charging means 32 is located adjacent to the thermoplastic surface 12 to provide an electrical charge on the tone wheel 2 prior to the holographic recording operation. The charging means 32 is provided with an input terminal 34 for connection to a suitable energizing source (not shown).

MODE OF OPERATION

The holographic recording on the tone wheel 2 is a holographic memory which makes use of a thermoplastic memory medium 12 upon which many individual holograms are sequentially stored during the rotation of the tone wheel 2. Information is stored by directing a coherent signal beam 22 and a coherent reference beam 20 derived from a laser 14 to a desired location on the memory medium. The signal beam 22, which contains a pattern formed by the Fourier transform optics 26 and the slit 30, interferes with the reference beam to form the holographic recording on the thermoplastic medium 12 since the beams 20 and 22 are modulated by the modulator 16, at a high frequency, e.g., one MHz, the holographic recording is a succession of one-dimensional Fourier transform patterns. Since the holographic recording process is performed on the capstan/motor/tone wheel combination, the recordings are each affected by any corresponding intrinsic defects of this rotating structure which occur as each recording is made. Thus, each recording is unique to the rotating structure upon which it is made and is related to the rotational speed of the rotating assembly, i.e., the capstan speed. The use of the holographic tone wheel 2 in a tape drive system in which the holographic recordings are read from the tone wheel 2 is effective to provide a means for eliminating cyclical meachanical imperfections in the rotating assembly since the mechanical errors will similarly affect the tape recording and playback operations whereby identical tape speeds can be maintained.

In FIG. 3, there is shown a playback system for reading the stored holograms from the tone wheel 2 during the use of the capstan/motor/tone wheel assembly to drive a magnetic recording tape 38. To read out the information stored in each of the recorded holograms, a coherent readout beam 40 from a coherent light source is arranged to successively illuminate each of the holograms stored on the tone wheel 2 to produce a reconstructed image thereof. The readout beam 40 is directed onto the hologram recordings on the tone wheel 2 at the same angle that the reference beam 20 made during the recording of the holograms. An array of photo detectors 44 is positioned on the other side of the tone wheel 2 from the source 42 to detect the reconstructed pattern. The readout beam 40 is preferably the complex conjugate of the reference beam whereby a real image readout is produced which eliminates the need for a readout lens. The output signal from the photo detector array 44 is applied to a suitable conventional control system 46 for controlling the speed of the motor in accordance with the detected signal from the tone wheel 2.

The holographic memory technique can increase the number of stored tone wheel "lines" per revolution from ten to a hundred times above the present tone wheel "line" recording technology to improve motor control system operation at low rotational tone wheel speeds. Because the number of "lines" per revolution can be greatly increased, the diameter of the one wheel disc can be reduced to reduce the moment of inertia of the rotating tape drive system and further increase the performance of the tape drive system. Another advantage of the holographic memory is that the information stored in the hologram is stored uniformly throughout the hologram rather than in discrete areas. The hologram is, thus, relatively insensitive to blemishs or dirt on the code wheel, i.e., a small blemish or dust particle on the tone wheel cannot obscure the recorded data inasmuch as the same data is found distributed uniformly across the hologram. Further, the improved holographic system of the present invention overcomes some of the limtations caused by components of prior art holographic memory by not requiring a light beam system capable of a large number of resolvable spots.

While the holographic recording technique used in the present invention is generally shown in the aforesaid copending U.S. Patent application of Michael F. Braitberg et al., that patent application discloses a system wherein the recording surface is a thermoplastic medium supported by a photo-conductor in a four layer structure including a transparent film base and a transparent electrical conductor underlying the photo-conductive layer. In the present novel recording technique it has been found that a simplified direct recording technique is possible wherein the exposing laser is used in a direct thermal development on a thermoplastic layer located directly on a transparent substrate. This simplified technique only requires that the thermoplastic layer is charged with a corona charger or similar device prior to the laser heating the thermoplastic film in the desired area. The charge on the thermoplastic layer creates internal stresses which deform the thermoplastic surface that has been made liquid, or plastic, due to the absorbed energy from the laser beam. The stored image, or surface deformation, on the thermoplastic layer is made permanent as the thermoplastic layer is subsequently cooled.

A holographic recording on the thermoplastic surface of the tone wheel 2 structure has several advantages. First, the resulting hologram is a phase hologram having a high readout efficiency. Secondly, the hologram recorded in the thermoplastic medium can be erased by subsequent application of heat to the thermoplastic medium for a duration which is longer than that used for development of the holographic recording. The ability to erase recorded holograms allows the tone wheel 2 to be reused with subsequent capstan/motor combinations. Thus, the memory medium is easily transportable, replaceable, alterable and interchangeable. Finally, the optical system for recording and reading the hologram achieves a non-contact operation of the tone wheel which eliminates any mechanical wear problem such as those found in magnetically recorded tone wheels.

Accordingly, it may be seen that there has been provided, in accordance with the present invention, a sync-off-tach tape drive control system having integral means for correcting intrinsic errors on the tape drive system.

The embodiments of the invention in which an exclusive property or privilege is claimed are defined as follows:

1. A method of producing a tape drive means including the steps of driving a coaxial assembly of a motor, a capstan and a tone wheel at a predetermined rotational speed and concurrently recording a succession of one dimensional holograms radially arranged on said tone wheel.

2. A method as set forth in claim 1 wherein said tone wheel includes a thermoplastic layer and including the further steps of softening said thermoplastic layer before recording each of said holograms to be recorded and allowing said layer to harden after a hologram recording to retain said holograms.

3. A method as set forth in claim 2 and including the further step of applying an electrostatic charge to said thermoplastic layer prior to the hologram recording.

4. A method of producing a motor and tone wheel assembly including the steps of driving a coaxial assembly of a motor and a tone wheel having a fixed mutual relationship at a predetermined rotational speed and concurrently a succession of one dimensional holograms radially arranged on said tone wheel.

5. A method as set forth in claim 4 wherein said tone wheel includes a thermoplastic layer and including the further steps of softening said thermoplastic layer before recording each of said holograms to be recorded and allowing said layer to harden after a hologram recording to retain said holograms.

6. A method as set forth in claim 4 and including the further step of applying an electrostatic charge to said thermoplastic layer prior to the hologram recording.

7. A method of producing a motor and tone wheel assembly including the steps of driving a coaxial assembly of a motor and tone wheel at a predetermined rotational speed and concurrently recording a succession of one dimensional holograms radially arranged on said tone wheel.

8. A method as set forth in claim 7 wherein said tone wheel includes a thermoplastic layer and including the further steps of softening said thermoplastic layer before recording each of said holograms to be recorded and allowing said layer to harden after a hologram recording to retain said holograms.

9. A method as set forth in claim 8 and including the further step of applying an electrostatic charge to said thermoplastic layer prior to the hologram recording.

* * * * *